(12) United States Patent
Taki (10) Patent No.: US 9,555,674 B2
(45) Date of Patent: Jan. 31, 2017

(54) VEHICLE WHEEL INFORMATION ACQUIRING DEVICE

(71) Applicant: TOYOTA JIDOSHA KABUSHIKI KAISHA, Toyota-shi, Aichi-ken (JP)

(72) Inventor: Yuji Taki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/905,028

(22) PCT Filed: Jul. 14, 2014

(86) PCT No.: PCT/IB2014/001316
§ 371 (c)(1),
(2) Date: Jan. 14, 2016

(87) PCT Pub. No.: WO2015/008129
PCT Pub. Date: Jan. 22, 2015

(65) Prior Publication Data
US 2016/0159171 A1    Jun. 9, 2016

(30) Foreign Application Priority Data
Jul. 17, 2013  (JP) ................................. 2013-148132

(51) Int. Cl.
*B60Q 1/00* (2006.01)
*B60C 23/04* (2006.01)

(52) U.S. Cl.
CPC ......... *B60C 23/0474* (2013.01); *B60C 23/045* (2013.01); *B60C 23/0435* (2013.01); *B60C 23/0457* (2013.01); *B60C 23/0461* (2013.01); *B60C 23/0488* (2013.01); *B60C 23/0489* (2013.01)

(58) Field of Classification Search
CPC ............... B60C 23/0435; B60C 23/045; B60C 23/0457; B60C 23/0461; B60C 23/0474; B60C 23/0488; B60C 23/0489
USPC ............................. 340/442–447; 701/1, 33.6
See application file for complete search history.

(56) References Cited

U.S. PATENT DOCUMENTS 6,034,597 A  *  3/2000  Normann ............ B60C 23/0416
                                                       340/442
6,181,993 B1 *  1/2001  Dale, Jr. ............... G01B 11/275
                                                       33/203.18
(Continued)

FOREIGN PATENT DOCUMENTS

JP       2004-359119 A    12/2004
JP       2006-312342 A    11/2006
(Continued)

*Primary Examiner* — Ojiako Nwugo
(74) *Attorney, Agent, or Firm* — Oliff PLC (57) ABSTRACT

A vehicle wheel information acquiring device includes a vehicle wheel sensor and a vehicle-body-side device. The vehicle wheel sensor is configured to revolve around an axle with a rotation of a vehicle wheel. The vehicle-body-side device includes a reception unit, a processing unit, a rotation position acquiring unit, an on-reception rotation position storage unit, and a determination unit. The determination unit is configured to determine whether a revolution position of the vehicle wheel sensor is included in an insufficient received intensity area during a stopping operation of a vehicle.

8 Claims, 8 Drawing Sheets

(56) References Cited

U.S. PATENT DOCUMENTS

| | | | | |
|---|---|---|---|---|
| 6,430,484 | B1* | 8/2002 | Takamura | B60C 23/0408 340/447 |
| 2004/0056764 | A1* | 3/2004 | Kusunoki | B60C 23/0408 340/442 |
| 2004/0064219 | A1* | 4/2004 | Mancosu | B60C 23/0411 73/146 |
| 2004/0230350 | A1* | 11/2004 | Ogawa | B60C 23/0416 701/1 |
| 2005/0172707 | A1* | 8/2005 | Kanatani | B60C 23/0416 73/146 |
| 2006/0250228 | A1 | 11/2006 | Mori et al. | |
| 2008/0082220 | A1* | 4/2008 | Saito | B60C 23/0408 701/1 |
| 2008/0157950 | A1* | 7/2008 | Mori | B60C 23/0416 340/438 |
| 2014/0076040 | A1* | 3/2014 | Shima | B60C 23/0416 73/146.5 |

FOREIGN PATENT DOCUMENTS

| | | |
|---|---|---|
| JP | 2007-015491 A | 1/2007 |
| JP | 2008-162534 A | 7/2008 |

* cited by examiner

VEHICLE WHEEL INFORMATION ACQUIRING DEVICE

BACKGROUND OF THE INVENTION

1. Field of the Invention

The present invention relates to a vehicle wheel information acquiring device that includes a vehicle wheel sensor fixed to a vehicle wheel and a vehicle-body-side device fixed to a vehicle body and that causes the vehicle wheel sensor to transmit a vehicle wheel state quantity such as a tire pressure to the vehicle-body-side device using a radio signal and causes the vehicle-body-side device to acquire the vehicle wheel state quantity.

2. Description of Related Art

In the related art, a device is known which detects a vehicle wheel state quantity such as a tire pressure and notifies a driver of the vehicle wheel state quantity. For example, in a tire pressure detector, proposed in Japanese Patent Application Publication No. 2006-312342 (JP 2006-312342 A), each vehicle wheel is provided with a sensor that detects a tire pressure, tire pressure information is transmitted from the sensors using a radio signal, and a vehicle-body-side device receives the radio signal and acquires the tire pressure information. When it is determined on the basis of received vehicle wheel information that the tire pressure is lowered, the vehicle-body-side device displays the intent on an annunciator to notify a driver of the intent.

Figure 8:
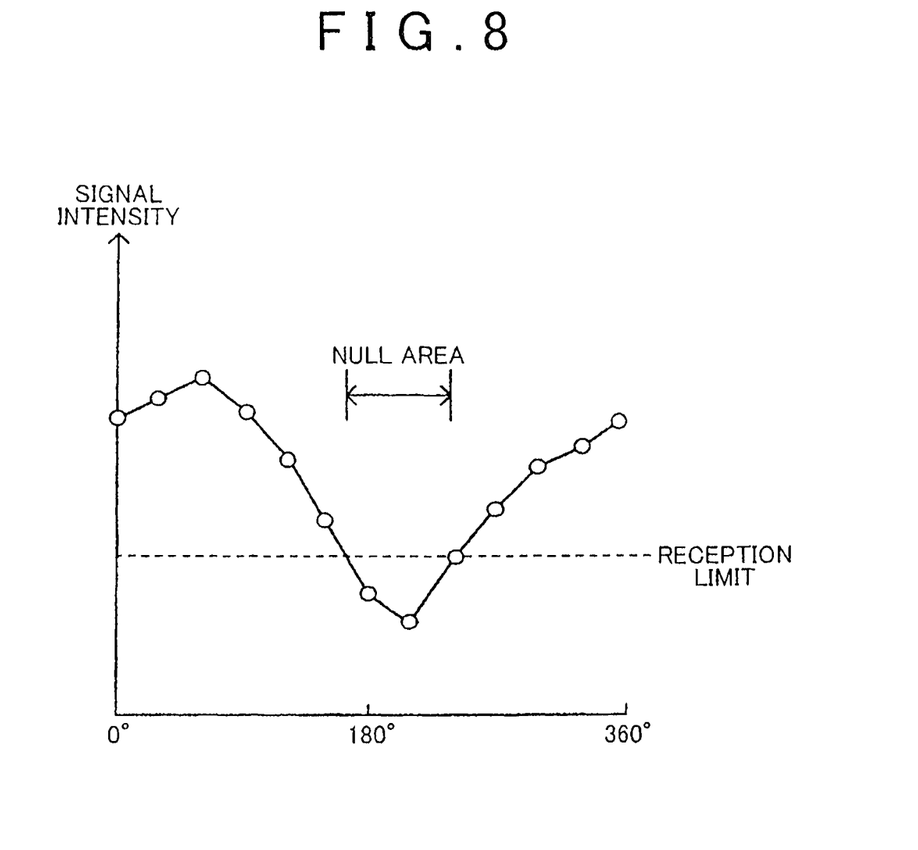
FIG. 8 is a graph illustrating a relationship between a vehicle wheel rotation angle and a received radio signal intensity.

However, since the sensor revolves around an axle with the rotation of the corresponding vehicle wheel, the received intensity of the radio signal transmitted from the sensor in the vehicle-body-side device varies depending on the rotation position of the vehicle wheel. Accordingly, a vehicle wheel rotation position at which the vehicle-body-side device cannot receive the radio signal is present. FIG. 8 illustrates an example of a relationship between rotation positions (0° to 360°) of a vehicle wheel and received signal intensity indices. As can be seen from the drawing, the received signal intensity depends on the rotation position of the vehicle wheel (the revolution position of the sensor) and the received signal intensity may be less than a reception limit depending on the rotation position of the vehicle wheel. Accordingly, when a vehicle stops at a vehicle wheel rotation position at which the radio signal cannot be received, vehicle wheel information such as a tire pressure cannot be acquired before start of driving at the time of the next start of the running.

SUMMARY OF THE INVENTION

The present invention provides a vehicle wheel information acquiring device that gives assistance so that a vehicle can stop at a position at which vehicle wheel information can be acquired.

A vehicle wheel information acquiring device according to an aspect of the present invention includes a vehicle wheel sensor and a vehicle-body-side device. The vehicle wheel sensor includes a sensor unit and a transmission unit, the sensor unit being fixed to a vehicle wheel and being configured to detect a vehicle wheel state quantity indicating a state of the vehicle wheel, the transmission unit being configured to transmit the vehicle wheel state quantity detected by the sensor unit at a predetermined timing using a radio signal, and the vehicle wheel sensor being configured to revolve around an axle with a rotation of the vehicle wheel. The vehicle-body-side device includes a reception unit, a processing unit, a rotation position acquiring unit, an on-reception rotation position storage unit, and a determination unit, the reception unit being fixed to a vehicle body and being configured to receive the radio signal transmitted from the vehicle wheel sensor, the processing unit being configured to acquire the vehicle wheel state quantity from the radio signal received by the reception unit and to perform a process corresponding to the vehicle wheel state quantity, the rotation position acquiring unit being configured to acquire a rotation position of the vehicle wheel, the on-reception rotation position storage unit being configured to store the rotation position of the vehicle wheel when the radio signal is received, and the determination unit being configured to determine whether a revolution position of the vehicle wheel sensor is included in an insufficient received intensity area based on the rotation position of the vehicle wheel when the radio signal is received during a stopping operation of a vehicle and a current rotation position of the vehicle wheel. The insufficient received intensity area is a revolution position range of the vehicle wheel sensor in which the received intensity of the radio signal in the reception unit is insufficient.

According to the aspect of the present invention, the vehicle wheel sensor is fixed to the vehicle wheel and the vehicle-body-side device is fixed to the vehicle body. The vehicle wheel sensor includes the sensor unit configured to detect the vehicle wheel state quantity indicating the state of the vehicle wheel and the transmission unit configured to transmit the vehicle wheel state quantity detected by the sensor unit using a radio signal at a predetermined timing. The vehicle-body-side device includes the reception unit configured to receive the radio signal transmitted from the vehicle wheel sensor and the processing unit configured to acquire the vehicle wheel state quantity from the radio signal received by the reception unit and to perform a process corresponding to the vehicle wheel state quantity. For example, the processing unit notifies a driver of the vehicle wheel state quantity, or determines whether the vehicle wheel state quantity is appropriate and notifies the driver of the determination result.

Since the vehicle wheel sensor revolves around the axle with the rotation of the vehicle wheel, the received intensity of the radio signal received by the reception unit varies depending on the rotation position of the vehicle wheel. When the vehicle stops and the rotation position of the vehicle wheel (the revolution position of the vehicle wheel sensor) is included in the insufficient received intensity area in which the received intensity of the radio signal in the reception unit is insufficient, vehicle wheel information before the running is started cannot be acquired at the time of the next start of the running.

On the other hand, the vehicle-body-side device according to the aspect of the present invention includes the rotation position acquiring unit, the on-reception rotation position storage unit, and the determination unit. The rotation position acquiring unit acquires the rotation position of the vehicle wheel. The on-reception rotation position storage unit stores the rotation position of the vehicle wheel when the radio signal is received. By storing the on-reception rotation position, the current revolution position of the vehicle wheel sensor can be specified using the stored rotation position or the revolution position range of the vehicle wheel sensor in which the radio signal can be received can be specified using the stored rotation position.

For example, when the transmission unit of the vehicle wheel sensor transmits the radio signal at a time point at which the revolution position of the Vehicle wheel sensor is a predetermined position, the current revolution position of the vehicle wheel sensor can be calculated with respect to the on-reception rotation position. When the transmission unit of the vehicle wheel sensor transmits the radio signal at predetermined time intervals, the revolution position range of the vehicle wheel sensor in which the radio signal can be received (or cannot be received) can be calculated.

The determination unit determines whether the revolution position of the vehicle wheel sensor revolving around the axle with the rotation of the vehicle wheel is included in the insufficient received intensity area in which the received intensity of the radio signal in the reception unit is insufficient during the stopping operation of the vehicle, on the basis of the rotation position of the vehicle wheel when the radio signal is received and the current rotation position of the vehicle wheel. Whether the revolution position of the vehicle wheel sensor when the vehicle is stopped is included in the insufficient received intensity area can be understood, by this determination, and a process corresponding to the determination result can be performed. Accordingly, according to the aspect of the present invention, it is possible to give assistance so that a vehicle can stop at a position at which vehicle wheel information (vehicle wheel state quantity) can be acquired.

In the aspect of the present invention, the transmission unit of the vehicle wheel sensor may be configured to transmit the radio signal when the revolution position of the vehicle wheel sensor reaches a predetermined position. Furthermore, the vehicle-body-side device may further include an insufficient received intensity area storage unit configured to store the insufficient received intensity area in advance. Furthermore, the determination unit may be a revolution position estimating unit configured to estimate the revolution position of the vehicle wheel sensor based on the rotation position of the vehicle wheel when the radio signal is received and the current rotation position of the vehicle wheel. Furthermore, the determination unit may be configured to estimate the revolution position of the vehicle wheel sensor during the stopping operation of the vehicle and to determine whether the estimated revolution position of the vehicle wheel sensor is included in the insufficient received intensity area.

In the aspect of the present invention, the transmission unit of the vehicle wheel sensor transmits the radio signal when the revolution position of the vehicle wheel sensor reaches a predetermined position. Accordingly, the vehicle-body-side device can understand the revolution position of the vehicle wheel sensor when the radio signal is received. In the vehicle-body-side device, the revolution position estimating unit estimates the revolution position of the vehicle wheel sensor on the basis of the rotation position of the vehicle wheel when the radio signal is received and the current rotation position of the vehicle wheel. The revolution position of the vehicle wheel sensor at which the received intensity of the radio signal in the reception unit is insufficient can be acquired in advance by experiment and is stored in the insufficient received intensity area storage unit. For example, the insufficient received intensity area storage unit only has to store information in which the relative positional relationship between the position at which the vehicle wheel sensor transmits the radio signal and the insufficient received intensity area is specified. The determination unit determines whether the revolution position of the vehicle wheel sensor estimated by the revolution position estimating unit during stopping of the vehicle is included in the insufficient received intensity area. Accordingly, it is possible to simply and appropriately perform the determination.

The vehicle wheel sensor may include an acceleration detector configured to output a pulse signal which varies depending on the revolution position during the rotating of the vehicle wheel. The vehicle wheel sensor may acquire a timing at which the revolution position of the vehicle wheel sensor is the predetermined position on the basis of the pulse signal and may transmit the radio signal at the time. According to this configuration, it is possible to simply understand the revolution position of the vehicle wheel sensor. Accordingly, it is possible to appropriately determine whether the revolution position of the vehicle wheel sensor is included in the insufficient received intensity area, on the basis of the revolution position of the vehicle wheel sensor and the insufficient received intensity area.

In the aspect of the present invention, the transmission unit of the vehicle wheel sensor may be configured to transmit the radio signal at predetermined time intervals. Furthermore, the vehicle-body-side device may further include an insufficient received intensity area setting unit configured to accumulate data indicating the rotation position of the vehicle wheel when the radio signal is received and to set a rotation position area of the vehicle wheel in which the received intensity of the radio signal in the reception unit is insufficient as the insufficient received intensity area based on the accumulated data. Furthermore, the determination unit may be configured to determine whether the rotation position of the vehicle wheel during the stopping operation of the vehicle is included in the set insufficient received intensity area.

When the transmission unit of the vehicle wheel sensor transmits the radio signal at predetermined time intervals, the rotation position of the vehicle wheel when the vehicle-body-side device receives the radio signal is not constant. When the vehicle-body-side device cannot receive the radio signal, the rotation position of the vehicle wheel cannot be acquired. Accordingly, by accumulating data indicating the rotation position of the vehicle wheel when the radio signal is received, the rotation position area of the vehicle wheel in which the radio signal can be received can be estimated. It may be regarded that this is substantially the same as estimating the rotation position area of the vehicle wheel in which the radio signal cannot be received.

Therefore, according to the aspect of the present invention, the insufficient received intensity area setting unit of the vehicle-body-side device accumulates the data indicating the rotation position of the vehicle wheel when the radio signal is received and sets the rotation position area of the vehicle wheel in which the received intensity of the radio signal in the reception unit is insufficient as the insufficient received intensity area on the basis of the accumulated data. The determination unit determines whether the rotation position of the vehicle wheel during the stopping operation of the vehicle is included in the insufficient received intensity area. It may be regarded that this process of the determination unit is substantially the same as the process of determining whether the revolution position of the vehicle wheel sensor is included in the insufficient received intensity area.

Therefore, according to the aspect of the present invention, since the insufficient received intensity area is automatically set, it is not necessary to set the insufficient received intensity area in advance. Even when the insufficient received intensity area varies with the aging degradation, it is possible to cope with the variation.

In the aspect of the present invention, the determination unit may be configured to transmit a notification command to notify a driver of a determination result to an annunciator when it is determined that the revolution position of the vehicle wheel sensor is included in the insufficient received intensity area. Furthermore, the annunciator may be configured to notify the driver of the determination result.

In the aspect of the present invention, when the determination unit determines that the revolution position of the vehicle wheel sensor is included in the insufficient received intensity area, the notification unit transmits the notification command for notifying the driver of the determination result to the annunciator. Accordingly, the driver is guided by the notification of the annunciator and can adjust the stopping position of the vehicle so that the revolution position of the vehicle wheel sensor is not included in the insufficient received intensity area. Here, the expression of "the revolution position of the vehicle wheel sensor is included in the insufficient received intensity area" means "the revolution position of the vehicle wheel sensor at the estimated stopping position of the vehicle is included in the insufficient received intensity area" as well as "the current revolution position of vehicle wheel sensor is included in the insufficient received intensity area".

In the aspect of the present invention, the determination unit may be a brake control command unit configured to output a control command to control a braking force of the vehicle wheel so as to cause the revolution position of the vehicle wheel sensor at a time of stopping of the vehicle not to be included in the insufficient received intensity area to a brake controller.

In the aspect of the present invention, it is possible to control the braking force depending on the determination result of the determination unit. Specifically, the brake control command unit outputs a control command for controlling the braking force of the vehicle wheel so as to cause the revolution position of the vehicle wheel sensor at the time of stopping of the vehicle not to be included in the insufficient received intensity area to the brake controller. Accordingly, the brake controller receiving the control command controls the braking force of the vehicle wheel so as to cause the final revolution position of the vehicle wheel sensor at the time of stopping of the vehicle not to be included in the insufficient received intensity area. Therefore, the revolution position of the vehicle wheel sensor can be automatically set to a position not included in the insufficient received intensity area without causing the driver to adjust the degree of stepping on the brake pedal. As a result, it is possible to decrease a possibility that the vehicle wheel information cannot be acquired before the start of the running.

In the aspect of the present invention, the brake control command unit may be configured to set a target stopping rotation position of the vehicle wheel which is a position at which the revolution position of the vehicle wheel sensor at the time of stopping of the vehicle is not included in the insufficient received intensity area and to output the control command to cause the rotation position of the vehicle wheel at the time of stopping of the vehicle to be the target stopping rotation position.

In the aspect of the present invention, the brake control command unit sets a target stopping rotation position of the vehicle wheel at which the revolution position of the vehicle wheel sensor at the time of stopping of the vehicle is not included in the insufficient received intensity area. The brake control command unit outputs a control command for causing the rotation position of the vehicle wheel at the time of stopping of the vehicle to be the target stopping rotation position. For example, a target stopping distance which is the distance from the current rotation position of the vehicle wheel to the target stopping rotation position or a target deceleration for causing the vehicle to stop at the target stopping rotation position is output as the control command. Accordingly, it is possible to appropriately set the revolution position of the vehicle wheel sensor to a position not included in the insufficient received intensity area.

In the aspect of the present invention, the vehicle wheel sensor may further include a tire pressure sensor configured to detect a tire pressure. Furthermore, the transmission unit may be configured to transmit information indicating the detected tire pressure to the reception unit using the radio signal.

In the aspect of the present invention, the rotation position acquiring unit may be configured to acquire the rotation position of the vehicle wheel based on a pulse signal output from a vehicle wheel speed sensor when the vehicle wheel rotates by a predetermined angle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
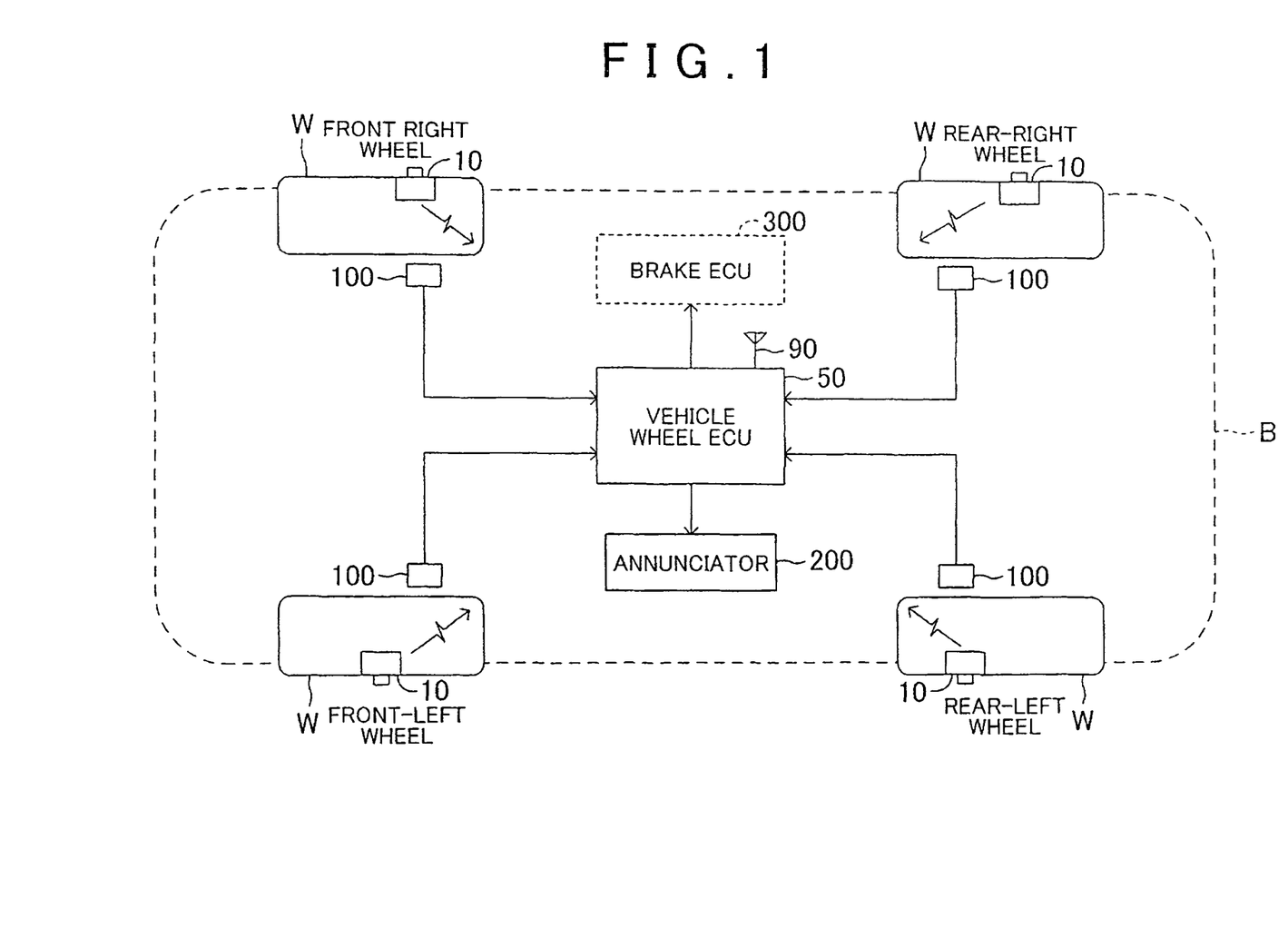
FIG. 1 is a diagram schematically illustrating a vehicle wheel information acquiring device according to an embodiment of the present invention.
Figure 2:
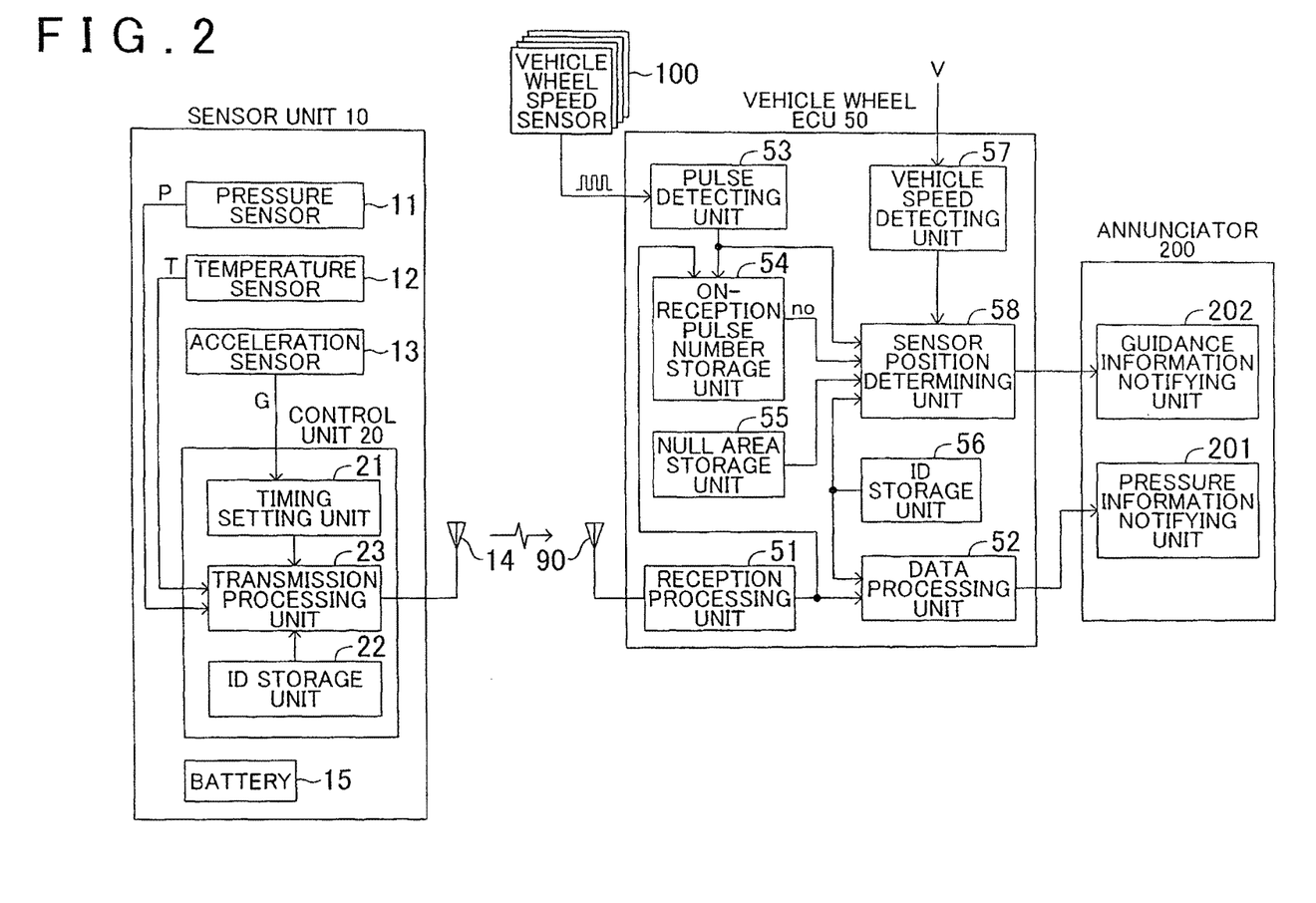
FIG. 2 is a functional block diagram illustrating a sensor unit and a vehicle wheel ECU according to a first embodiment of the present invention.

Hereinafter, a vehicle wheel information acquiring device of a vehicle according to an embodiment of the present invention will be described with reference to the accompanying drawings. FIG. 1 is a diagram schematically illustrating a configuration of a vehicle wheel information acquiring device according to the embodiment. The vehicle wheel information acquiring device is a device for notifying a driver of tire pressure information and includes a tire pressure sensor unit 10 (hereinafter, referred to as sensor unit 10) fixed to each vehicle wheel W disposed to be rotatable relative to a vehicle body B and a vehicle wheel information processing unit 50 (hereinafter, referred to as vehicle wheel ECU 50) fixed to the vehicle body B. FIG. 2 is a functional block diagram of the sensor units 10 and the vehicle wheel ECU 50 according to a first embodiment. The sensor units 10 disposed in four wheels have the same function and thus one thereof is illustrated.

Each sensor unit 10 is attached to a tire air injection valve of the corresponding vehicle wheel W. The sensor unit 10 includes a pressure sensor 11, a temperature sensor 12, an acceleration sensor 13, a control unit 20, an antenna 14, and a battery 15. The pressure sensor 11 detects the pressure of the corresponding tire and outputs a detection signal indicating the pressure P to the control unit 20. The temperature sensor 12 detects the temperature of the tire and outputs a detection signal indicating the tire temperature T to the control unit 20. The acceleration sensor 13 detects an acceleration in a centrifugal direction of the vehicle wheel W and outputs a detection signal the acceleration G to the control unit 20.

The control unit 20 includes a microcomputer and a communication circuit as principal parts and includes a timing setting unit 21 that sets the timing of transmitting a radio signal, an ID storage unit 22 that stores a sensor ID for specifying the sensor unit 10, and a transmission processing unit 23 that generates a radio signal and transmits the generated radio signal via the antenna 14 in terms of the functions thereof. The control unit 20 may be considered as a transmission unit of the present invention.

The timing setting unit 21 sets the timing of transmitting the radio signal on the basis of the acceleration G detected by the acceleration sensor 13 and the transmission time interval. When the vehicle wheel W rotates, the sensor unit 10 including the acceleration sensor 13 also revolves around an axle, thus a gravitational acceleration is added the output of the acceleration sensor 13 is added, and a ripple waveform with one turn of the vehicle wheel W as one cycle is formed. Accordingly, by extracting a ripple component of the acceleration G, it is possible to detect the timing at which the sensor unit 10 is located at the uppermost point or the lowermost point. Therefore, the timing setting unit 21 sets the timing at which the revolution position of the sensor unit 10 is located at the uppermost point (which may be the lowermost point) as the transmission timing of the radio signal on the basis of the acceleration G. Here, the revolution position of the sensor unit 10 at which the transmission timing of the radio signal is set is not included in a null area to be described later.

The transmission interval during the running is shortened when transmission timing of the radio signal is set on the basis of only the revolution position of the sensor unit 10, and thus a transmission time interval condition that the transmission time interval is greater than or equal to a predetermined time (for example, 1 minute) is given. That is, the timing at which a time elapsing after the radio signal is previously transmitted is greater than or equal to a predetermined time and the revolution position of the sensor unit 10 is a predetermined position (the uppermost point in this example) is set as the transmission timing of the radio signal.

The timing setting unit 21 includes a timer and measures the time elapsing after the radio signal is previously transmitted. The transmission timing of the radio signal is set as described above on the basis of the measured timer value and the variation of the acceleration G detected by the acceleration sensor 13, and a transmission command is output to the transmission processing unit 23 when the transmission timing arrives. Here, when the acceleration sensor 13 is disposed to detect the acceleration in the circumferential direction of the vehicle wheel W, the timing at which the revolution position is located at the foremost point and the backmost point (middle positions between the uppermost point and the lowermost point) of the vehicle wheel W may be detected on the basis of the ripple component of the acceleration G. Accordingly, the timing setting unit 21 can set the transmission timing based on the direction of the acceleration detected by the acceleration sensor 13.

When the transmission command is input from the timing setting unit 21, the transmission processing unit 23 reads the pressure P output from the pressure sensor 11, the tire temperature T output from the temperature sensor 12, and the sensor ID stored in the ID storage unit 22, generates transmission data in which the sensor ID is added to the pressure P and the tire temperature T, and transmits a radio signal obtained by modulating the transmission data via the antenna 14.

The battery 15 supplies power to electrical loads in the sensor unit 10.

On the other hand, the vehicle wheel ECU 50 includes a microcomputer and a communication circuit as principal parts, and includes a reception processing unit 51, a data processing unit 52, a pulse detecting unit 53, an on-reception pulse number storage unit 54, a null area storage unit 55, an ID storage unit 56, a vehicle speed detecting unit 57, and a sensor position determining unit 58 in terms of the functions thereof. The vehicle wheel ECU 50 is connected to a vehicle wheel speed sensor 100 that detects the vehicle wheel speed of each vehicle wheel W and an annunciator 200 disposed in the vicinity of a driver seat.

The reception processing unit 51 is connected to an antenna 90, receives the radio signal transmitted from the sensor units 10 via the antenna 90, extracts data the pressure P, the tire temperature T, and the sensor ID from the received signal, and outputs the extracted data to the data processing unit 52. The reception processing unit 51 outputs data indicating the sensor ID to the on-reception pulse number storage unit 54 at the timing of receiving the radio signal from the sensor units 10.

The data processing unit 52 stores a vehicle wheel identification codes (codes for specifying the front-right wheel, the front-left wheel, the rear-right wheel, and the rear-left wheel) correlated with the sensor IDs and generates and outputs pressure notification data for each vehicle wheel W to an annunciator 200. In this case, the data processing unit 52 determines whether the pressure P is in an appropriate range and adds the determination data to the pressure notification data. In this case, the data processing unit 52 corrects the appropriate range of the pressure P on the basis of the tire temperature T. The data processing unit 52 outputs tire overheating information to another vehicle controller not illustrated when the tire temperature T is an abnormal high temperature. The detection of the tire temperature T and the processing based on the tire temperature T do not need to be performed necessarily.

The annunciator 200 includes a pressure information notifying unit 201 that notifies the pressure information of the tires and a guidance information notifying unit 202 that notifies guidance information on a vehicle stopping position to be described later. The pressure notification data output from the data processing unit 52 is sent to the pressure information notifying unit 201.

The annunciator 200 may be an indicator disposed at a position at which the display is visible from the driver seat or may be a voice announcing device disposed at a position at which a sound is audible from the driver seat. When the indicator is used, the pressure information notifying unit 201 may have a configuration in which the tire pressure of each vehicle wheel W is displayed by numerical values or may have a configuration in which lighting is displayed to distinguish whether the tire pressure is appropriate or not for each vehicle wheel W. A configuration in which a single indicator common to four wheels may be used and the indicator is lighted when the tire pressure of any one tire is not appropriate may be employed.

Figure 3:
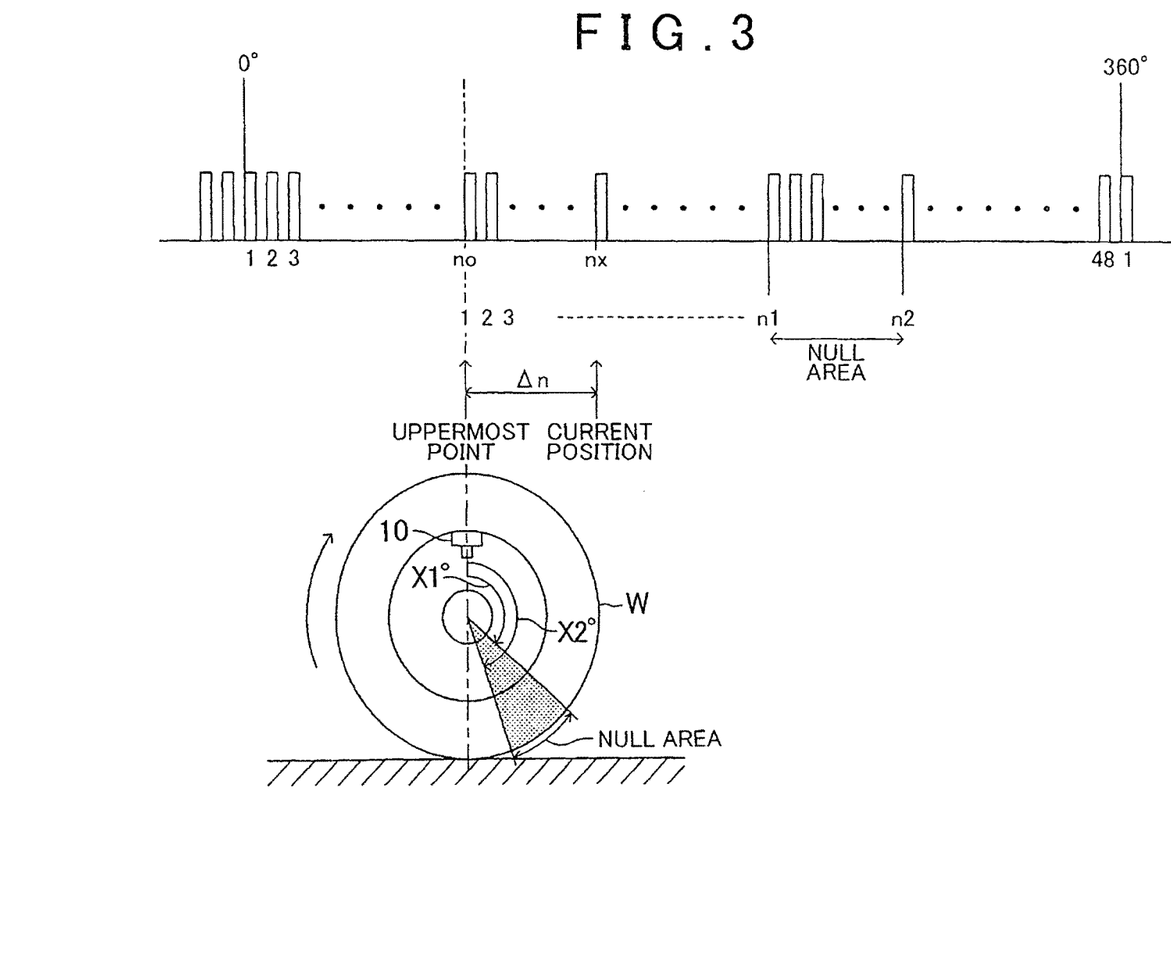
FIG. 3 is a diagram illustrating relationships of a pulse number varying with the rotation of a vehicle wheel, an on-reception pulse number n0, a current pulse number nx, and a null region (n1 to n2)

The pulse detecting unit 53 receives a pulse signal output from the vehicle wheel speed sensor 100 disposed in each vehicle wheel W. The vehicle wheel speed sensor 100 is constituted, for example, by a pulse encoder and outputs one pulse signal when the vehicle wheel W rotates by a predetermined angle. The vehicle wheel speed sensor 100 in this embodiment is fixed to the vehicle body B side and outputs 48 pulse signals at equal angular intervals while the vehicle wheel W rotates by one turn. The rotation angle of the vehicle wheel W can be detected on the basis of the number of pulse signals. For example, as illustrated in FIG. 3, an arbitrary position is set as the origin (0°) and the rotation position of the vehicle wheel W rotating from the origin can be detected using the number of pulse signals from the origin. Whenever receiving the pulse signal from each vehicle wheel speed sensor 100, the pulse detecting unit 53 outputs data (referred to as pulse number) indicating what number the received pulse signal is from the origin to the on-reception pulse number storage unit 54 and the sensor position determining unit 58 for each vehicle wheel speed sensor 100. When the vehicle wheel W rotates by one turn from the origin (when 48 pulse signals are input), the pulse detecting unit 53 resets the pulse number to 1. Here, the vehicle wheel speed sensor 100 in this embodiment is configured to detect the rotation direction. The pulse detecting unit 53 increases the pulse number when the vehicle wheel rotates forward (runs forward), and decreases the pulse number when the vehicle wheel rotates backward (runs backward). Hereinafter, the value of the pulse number is referred to as pulse number nx.

The on-reception pulse number storage unit 54 stores the pulse number nx, which is output from the pulse detecting unit 53 when data indicating the sensor ID is input from the data processing unit 52, for each sensor ID. The pulse number nx corresponds to the pulse number nx output from the pulse detecting unit 53 when a radio signal is transmitted from the sensor unit 10. As described above, the sensor unit 10 transmits the radio signal when the revolution position thereof is located at the uppermost point of the vehicle wheel W as illustrated in FIG. 3. Accordingly, the pulse number nx represents the rotation position of the vehicle wheel W when the sensor unit 10 is located at the uppermost point. The pulse number nx is referred to as on-reception pulse number n0. Since the transmission timing of the radio signal is uniquely determined depending on the rotation position of the vehicle wheel W, the on-reception pulse number n0 is constant.

The ID storage unit 56 stores the sensor ID as an identification code of each sensor unit 10 mounted on the vehicle wheel W in correlation with a vehicle wheel identification code indicating on what vehicle wheel (the front-right wheel, the front-left wheel, the rear-right wheel, or the rear-left wheel) the corresponding sensor unit 10 is mounted.

The null area storage unit 55 stores a rotation position area of each vehicle wheel W in which the radio signal transmitted from the corresponding sensor unit 10 is less than the receivable intensity in advance for each sensor ID. In the vehicle wheel ECU 50, the received intensity of the radio signal transmitted from the sensor unit 10 varies depending on the rotation position of the vehicle wheel W and a rotation position of the vehicle wheel W (the revolution position of the sensor unit 10) at which the radio signal cannot be received is present in some vehicle wheels W as illustrated in FIG. 8. The range of the rotation position of the vehicle wheel W (the revolution position of the sensor unit 10) in which the radio signal cannot be received is referred to as a null area; The null area can be acquired by experiment at the time of designing of the vehicle. The null area may not be present in some vehicle wheels W and the null area is not set for such vehicle wheels W.

For example, a position at which the sensor unit 10 is located at the uppermost point of the vehicle wheel W is set as a reference position as illustrated in FIG. 3, and the null area can be set by a rotation angle range (x1° to x2°) from the reference position. In this case, since the rotation position of the vehicle wheel W is calculated using the pulse number, a position at which the sensor unit 10 is located at the uppermost point of the vehicle wheel W is set as a reference position, and the null area is specified by the number of pulse signals n1 output from the vehicle wheel speed sensor 100 until the vehicle wheel W rotates from the reference position and reaches a start angle x1° of the null area and the number of pulse signals n2 output from the vehicle wheel speed sensor 100 until the vehicle wheel W rotates from the reference position and reaches to an end angle x2° of the null area. In the null area in this example, the number of pulse signals output after the sensor unit 10 passes through the reference position is in a range of n1 to n2. That is, the null area is specified by the relative positional relation to the rotation position at which the sensor unit 10 transmits the radio signal. The null area differs depending on the vehicle wheels W. Accordingly, the null area storage unit 55 stores the null area in correlation with the sensor ID for each sensor ID.

The vehicle speed detecting unit 57 detects a vehicle speed V. The vehicle speed V can acquire vehicle speed information, which is used by other vehicle controllers such as a brake controller, by CAN communication, but may be calculated on the basis of the average time interval of the pulse signals output from the four vehicle wheel speed sensors 100.

Figure 4:
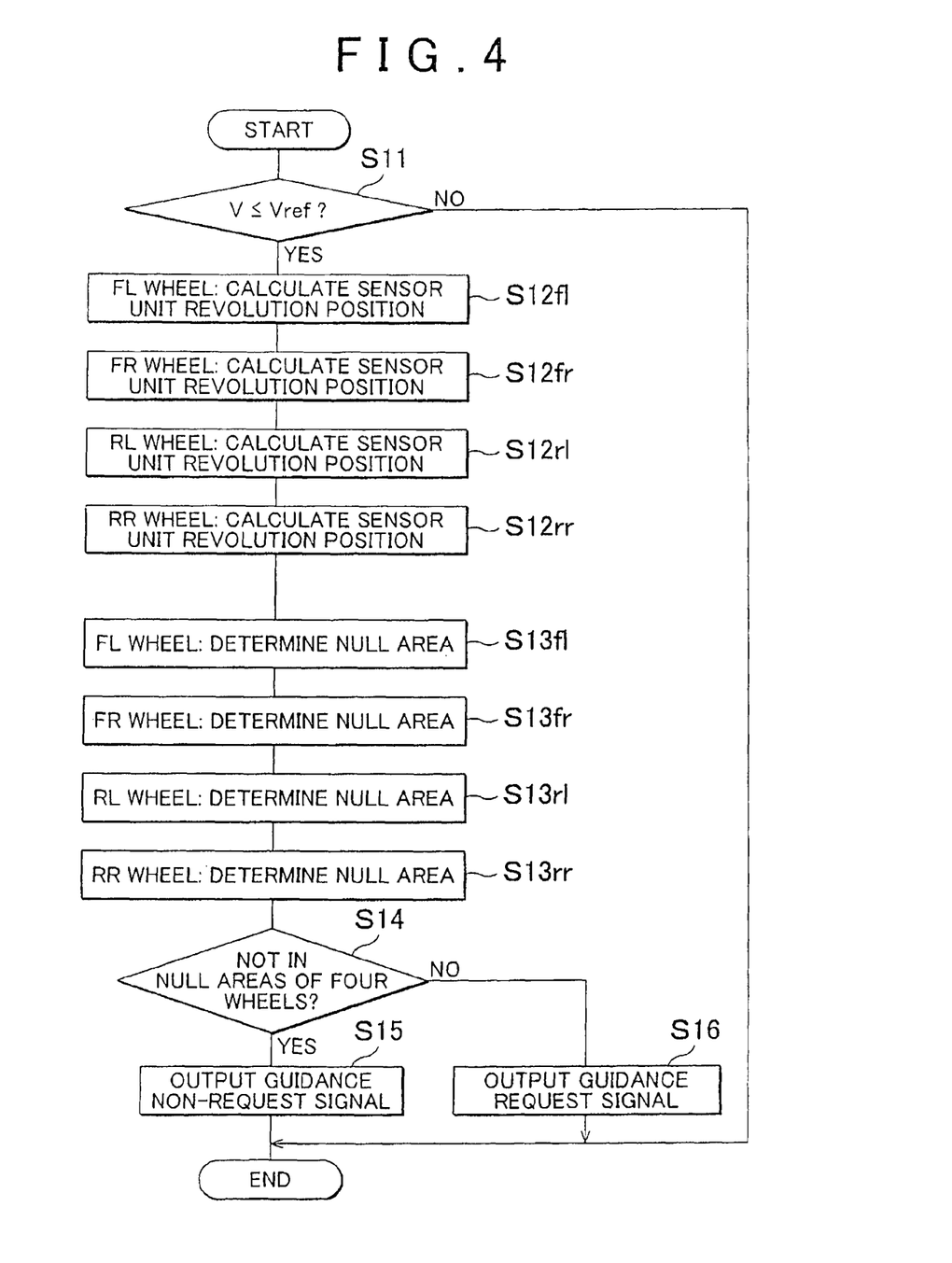
FIG. 4 is a flowchart illustrating a sensor position determination notifying routine.

The sensor position determining unit 58 receives the vehicle speed V, the pulse number nx for each vehicle wheel speed sensor 100, the on-reception pulse number n0 for each sensor ID, the null area (n1 to n2) for each sensor ID, and the sensor IDs, determines whether the revolution position of the sensor unit 10 is included in the null area for each sensor unit 10 on the basis of the received information, and outputs the determination result to the annunciator 200. The processes performed by the sensor position determining unit 58 will be described below with reference to the flowchart of FIG. 4. FIG. 4 illustrates a sensor position determining and notifying routine that is performed by the sensor position determining unit 58. This routine is repeatedly performed at a predetermined short period.

In step S11, the sensor position determining unit 58 reads the vehicle speed V from the vehicle speed detecting unit 57 and determines whether the vehicle speed V is lower than or equal to a predetermined very-low speed Vref. The very-low speed Vref is a speed immediately before the vehicle stops and is set to, for example, 5 km/h.

When it is determined that the vehicle speed V is higher than the very-low speed Vref (NO in S11), the sensor position determining unit 58 temporarily ends the routine. When a next computation timing arrives, the routine is restarted from step S11. When these processes are repeated and the vehicle speed V is lower than or equal to the very-low speed Vref (YES in step S11), the sensor position determining unit 58 reads the pulse number nx indicating the current rotation position of the vehicle wheel W as the front-left wheel and the on-reception pulse number n0 stored in the on-reception pulse number storage unit 54 and calculates the current revolution position of the sensor unit 10 in step S12*fl*. The sensor position determining unit 58 stores the newest pulse number nx output from the pulse detecting unit 53 and considers the newest pulse number as the pulse number nx (referred to as current pulse number nx) indicating the current rotation position of the vehicle wheel W. In this case, by what angle the current revolution position of the sensor unit 10 rotates from the uppermost point of the vehicle wheel W can be calculated on the basis of the difference $\Delta n (=nx-n0$, which is referred to as pulse number difference $\Delta n$) between the current pulse number nx and the on-reception pulse number n0. In this embodiment, since 48 pulse signals per turn of the vehicle wheel are output from the vehicle wheel speed sensor 100, the pulse number nx increases by one whenever the vehicle wheel W rotates by 7.5° (360°/48). In this case, by multiplying the pulse number difference $\Delta n$ by 7.5°, the revolution position of the sensor unit 10 with the uppermost point as a reference position can be calculated. In this way, the pulse number difference $\Delta n$ is a value corresponding to the current revolution position of the sensor unit 10.

After calculating the revolution position of the sensor unit 10 for the front-left wheel in this way, the sensor position determining unit 58 similarly performs a process (S12*fr*) calculating the revolution position of the sensor unit 10 for the front-right wheel, a process (S12*rl*) calculating the revolution position of the sensor unit 10 for the rear-left wheel, and a process (S12*rr*) calculating the revolution position of the sensor unit 10 for the rear-right wheel.

Subsequently, the sensor position determining unit 58 determines whether the current revolution position of the sensor unit 10 is included in the null area for the front-left wheel in step S13*fl*. In step S13*fl*, it is determined whether the pulse number difference $\Delta n$ is included in the null area (n1 to n2) designated by the pulse numbers. FIG. 3 illustrates an example of the relationship of the pulse number varying with the rotation of the vehicle wheel W, the on-reception pulse number n0, the current pulse number nx, and the null area (n1 to n2). The null area is expressed by the number of pulse signals (n1 to n2) output from the vehicle wheel speed sensor 100 when the vehicle wheel W rotates from the reference position at which the sensor unit 10 is located at the uppermost point of the vehicle wheel W to the rotation angle range (X1° to X2°). Accordingly, when the pulse number difference $\Delta n$ is greater than or equal to n1 and less than or equal to n2, it can be determined that the sensor unit 10 is located in the null area.

When determining whether the revolution position of the sensor unit 10 is included in the null area for the front-left wheel in this way, the sensor position determining unit 58 similarly performs a determination process (S13*fr*) for the front-right wheel, a determination process (S13*rl*) for the rear-left wheel, and a determination process (S13*rr*) for the rear-right wheel. When it is determined that the revolution position of the sensor unit 10 is included in the null area, the sensor position determining unit 58 sets a determination flag Ffl for the front-left wheel to "0", sets a determination flag Ffr for the front-right wheel to "0", sets a determination flag Frl for the rear-left wheel to "0", and sets a determination flag Frr for the rear-right wheel to "0". On the contrary, when it is determined that the revolution position of the sensor unit 10 is not included in the null area, the sensor position determining unit 58 sets a determination flag Ffl for the front-left wheel to "1", sets a determination flag Ffr for the front-right wheel to "1", sets a determination flag Frl for the rear-left wheel to "1", and sets a determination flag Frr for the rear-right wheel to "1".

Subsequently, in step S14, the sensor position determining unit 58 determines whether the revolution position of the sensor unit 10 is included in the null area for all the four vehicle wheels W. In this case, the determination result is "YES" when AND information of the determination flags Ffl, Ffr, Frl, and Frr is "1", and the determination result is "NO" otherwise. The sensor position determining unit 58 outputs a guidance non-request signal to the guidance information notifying unit 202 of the annunciator 200 in step S15 when the determination result is "YES", outputs a guidance request signal to the guidance information notifying unit 202 of the annunciator 200 in step S16 when the determination result is "NO", and then temporarily ends this routine. The sensor position determining unit 58 repeatedly performs these processes at a predetermined short period.

The guidance information notifying unit 202 of the annunciator 200 may be an indication lamp, a display capable of displaying characters, or a voice announce device. When the guidance request signal is input and the vehicle stops at that position, the guidance information notifying unit 202 notifies the driver of the intent that the tire pressure information cannot be acquired before the next running is started. In this case, only the indication lamp may be lighted for notification. When the guidance non-request signal is input, the guidance information notifying unit 202 does not perform the notification operation. The drive can adjust the position at which the vehicle stops with reference to the indication.

In the vehicle wheel information acquiring device according to the first embodiment, the sensor unit 10 can interactively communicate with the vehicle wheel ECU 50, can receive a command from the vehicle wheel ECU 50, and can transmit vehicle wheel information. That is, the transmission processing unit of the sensor unit 10 also has a reception processing function and the reception processing unit 51 of the vehicle wheel ECU 50 also has a transmission processing function.

The vehicle wheel ECU 50 is activated when an ignition switch is turned on, and transmits a radio signal indicating a vehicle wheel information request command to the sensor units 10. Each sensor unit 10 transmits a radio signal at the above-mentioned transmission timing, detects the tire pressure P and the tire temperature T at that time regardless of the rotation position of the vehicle wheel W only when receiving the request command, and transmits the detection result to the vehicle wheel ECU 50 using as the radio signal. At this time, when the revolution position of the sensor unit 10 (stopping position) is included in the null area, the vehicle wheel ECU 50 cannot receive the radio signal transmitted from the sensor unit 10. However, according to this embodiment, since the driver is guided so that the sensor unit 10 is located at a position not included in the null area during the previous stopping operation of the vehicle, it is possible to reduce the number of cases in which vehicle wheel information cannot be acquired before the start of the running.

Figure 5:
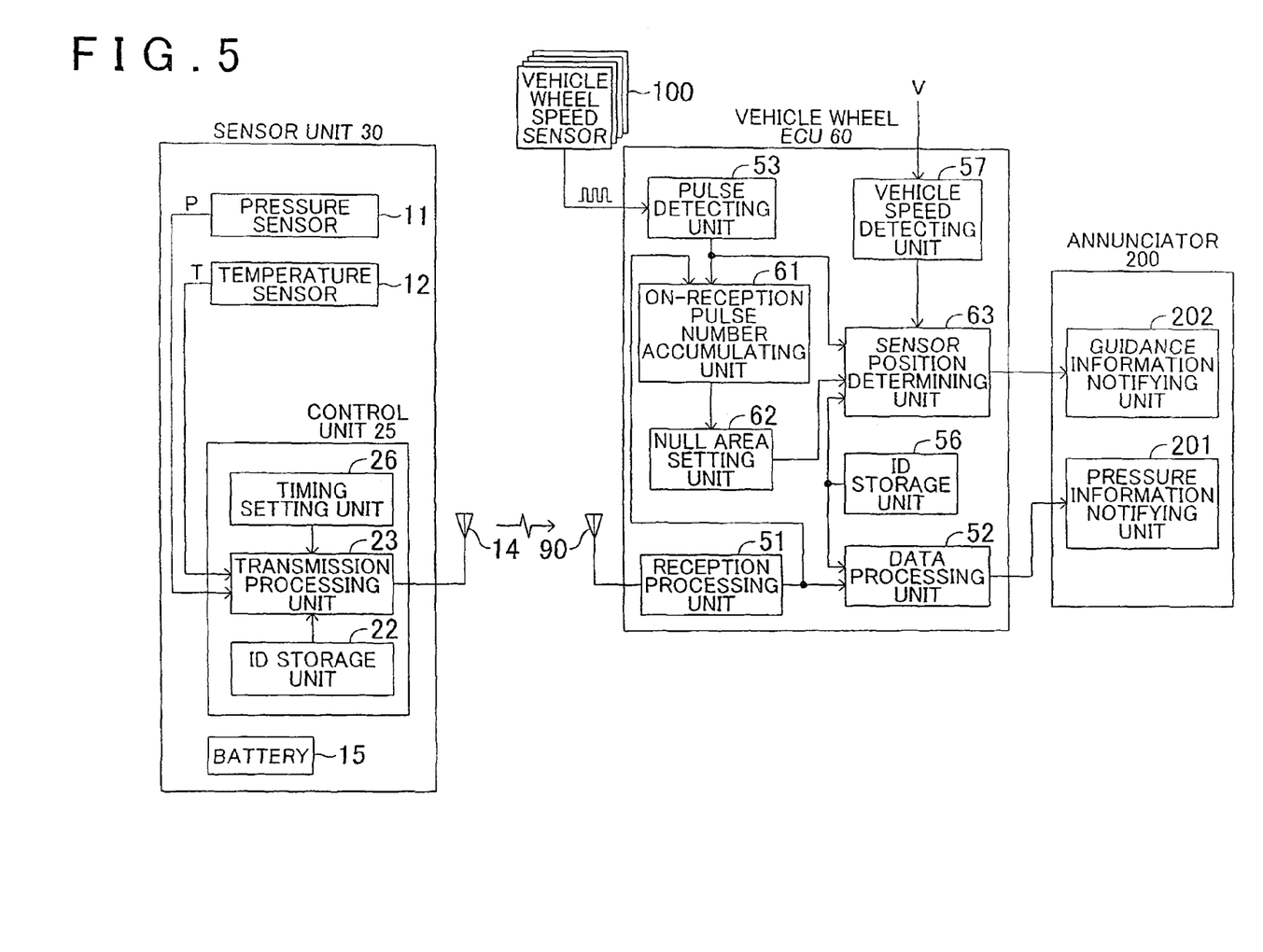
FIG. 5 is a functional block diagram illustrating a sensor unit and a vehicle wheel ECU according to a second embodiment of the present invention.

<Second Embodiment> A vehicle wheel information acquiring device according to a second embodiment will be described below. The vehicle wheel information acquiring device according to the first embodiment is configured to transmit a radio signal from each sensor unit when the revolution position of the sensor unit reaches a predetermined position, but the vehicle wheel information acquiring device according to the second embodiment employs a configuration in which a radio signal is transmitted from each sensor unit at predetermined time intervals. FIG. 5 illustrates schematic configurations of a sensor unit 30 and a vehicle wheel ECU 60 used in the vehicle wheel information acquiring device according to the second embodiment. The vehicle wheel information acquiring device according to the second embodiment includes sensor units 30 and a vehicle wheel ECU 60 instead of the sensor units 10 and the vehicle wheel ECU 50 in the first embodiment. The sensor units 30 are fixed to four vehicle wheels W, respectively, and the vehicle wheel ECU 60 is fixed to the vehicle body. In the drawing, elements having the same configurations as in the first embodiment will be referenced by the same reference signs as in the first embodiment and description thereof will not be repeated.

Each sensor unit 30 includes a pressure sensor 11, a temperature sensor 12, a control unit 25, an antenna 14, and a battery 15. The control unit 25 may be considered as the transmission unit of the present invention and includes a microcomputer and a communication circuit as principal parts. The control unit 25 includes a timing setting unit 26 that sets the timing of transmitting a radio signal, an ID storage unit 22 that stores a sensor ID for specifying the sensor unit 30, and a transmission processing unit 23 that generates a radio signal and transmits the generated radio signal via the antenna 14 in terms of the functions thereof. The transmission timing of the radio signal is set to a predetermined time interval (for example, for every 1 minute). That is, in the first embodiment, the time at which a predetermined time (for example, 1 minute) elapses after the previous transmission and the revolution position of the sensor unit 10 reaches a predetermined position (for example, uppermost point) is set as the transmission timing of the radio signal. However, in the second embodiment, the transmission timing of a radio signal is set to a time at which a predetermined time (for example, 1 minute) elapses after the previous transmission of a radio signal regardless of the revolution position of the sensor unit 30. Accordingly, the timing setting unit 26 includes a timer and outputs a transmission command to the transmission processing unit 23 at predetermined time intervals on the basis of the timer value.

On the other hand, the vehicle wheel ECU 60 includes a microcomputer and a communication circuit as principal parts, and includes a reception processing unit 51, a data processing unit 52, a pulse detecting unit 53, an on-reception pulse number accumulating unit 61, a null area setting unit 62, an ID storage unit 56, a vehicle speed detecting unit 57, and a sensor position determining unit 63 in terms of the functions thereof. The vehicle wheel ECU 60 is connected to a vehicle wheel speed sensor 100 that detects the vehicle wheel speed of each vehicle wheel W and an annunciator 200 disposed in the vicinity of a driver seat.

The on-reception pulse number accumulating unit 61 receives a pulse number output from the pulse detecting unit 53 and data indicating the sensor ID out of data output from the reception processing unit. The on-reception pulse number accumulating unit 61 stores the pulse number of the vehicle wheel speed sensor 100 for each sensor ID when receiving the data indicating the sensor ID from the reception processing unit 51 and accumulates the pulse number. In the first embodiment, the timing of transmitting a radio signal from each sensor unit 10 is set to the time at which the sensor unit 10 is located at the uppermost point of the vehicle wheel W and thus the stored pulse number is constant. However, in the second embodiment, the timing of transmitting a radio signal from each sensor unit 30 is set to a predetermined time interval and thus is not associated with the rotation position of the vehicle wheel W. Accordingly, whenever receiving the radio signal transmitted from each sensor unit 30, the on-reception pulse number accumulating unit 61 stores and accumulates information indicating the pulse number corresponding to the rotation position of the vehicle wheel W at that time for each sensor ID.

The null area setting unit 62 sets the null area for each sensor ID on the basis of the pulse number information accumulated in the on-reception pulse number accumulating unit 61. As described above, the pulse number accumulated in the on-reception pulse number accumulating unit 61 is a pulse number corresponding to the rotation position of the vehicle wheel W when a radio signal transmitted from the sensor unit 30 is received. That is, the pulse number corresponds to the rotation position of the vehicle wheel W when the vehicle wheel ECU 60 can receive a radio signal. On the other hand, when the revolution position of the sensor unit 30 is included in the null area and the sensor unit 30 transmits a radio signal, the pulse number is not stored in the on-reception pulse number accumulating unit 61. Accordingly, the pulse number stored and accumulated in the on-reception pulse number accumulating unit 61 is a pulse number in a situation in which the revolution position of the sensor unit 30 is not included in the null area. Therefore, by sampling plural pulse numbers, a vehicle wheel rotation area in which the revolution position of the sensor unit 30 is included in the null area and a vehicle wheel rotation area in which the revolution position of the sensor unit 30 is not included in the null area can be distinguished. Accordingly, the vehicle wheel rotation area corresponding to the pulse number group (for example, Nos. 25 to 30) not stored can be set as the null area. The null area setting unit 62 sets the null area for each sensor ID in this way and outputs the set null area to the sensor position determining unit 63.

The sensor position determining unit 63 receives the vehicle speed V, the pulse number nx for each vehicle wheel speed sensor 100, the null area for each sensor ID, and the sensor ID, determines whether the rotation position of each vehicle wheel W is included in the null area set for each vehicle wheel W on the basis of the input data, and outputs the determination result to the guidance information notifying unit 202 of the annunciator 200. In this process, the calculating of the revolution position of the sensor unit 10 in the first embodiment (the calculating of the pulse number difference Δn) does not need to be performed and it only has to be determined whether the current pulse number nx for each sensor ID is included in the null area set by the null area setting unit 62. Specifically, in the rotation position determining and displaying routine in the first embodiment (FIG. 4), the processes of steps S12fl to S12rr are skipped and it only has to be determined for each wheel as the processes of steps S13fl to S13rr whether the current pulse number nx is included in the null area set by the null area setting unit 62.

In the vehicle wheel information acquiring device according to the second embodiment, the sensor unit 30 is configured to only transmit data to the vehicle wheel ECU 60 (bidirectional communication is not possible) and thus a radio signal indicating vehicle wheel information is transmitted at predetermined time intervals (1 minute) in a unilateral way regardless of the ON/OFF state of the ignition switch. On the other hand, the vehicle wheel ECU 60 is activated when the ignition switch is turned on. Accordingly, the vehicle wheel ECU 60 can receive a radio signal indicating vehicle wheel information from the sensor unit 30 after it is activated. In this case, since the driver is guided so that the sensor unit 30 is located at a position not included in the null area during the previous stopping operation of the vehicle, it is possible to reduce the number of cases in which the vehicle wheel information cannot be acquired before start of the running.

In the second embodiment, since the null area is automatically set for each sensor ID, it is not necessary to store the null areas in advance. Even when the null areas vary with the aging degradation, it is possible to cope with the variation.

Here, the pulse numbers accumulated in the on-reception pulse number accumulating unit 61 can be limited to a predetermined number of newest pulse numbers (a predetermined time) and old data can be deleted. The null area setting unit 62 may set an area (non-null area) other than the null area. When the non-null area is known, the null area can be specified and thus both setting methods are substantially the same.

<Third Embodiment> A vehicle wheel information acquiring device according to a third embodiment will be described below. The first embodiment and the second embodiment employ the configuration in which the driver is guided so that the stopping position is an appropriate position using the annunciator 200, but the third embodiment employs a configuration in which a degree of assist of a brake is controlled instead. Accordingly, the vehicle wheel information acquiring device is connected to a brake controller (referred to as brake ECU) that controls the braking force of the vehicle wheels W so as to enable bidirectional communication.

Figure 6:
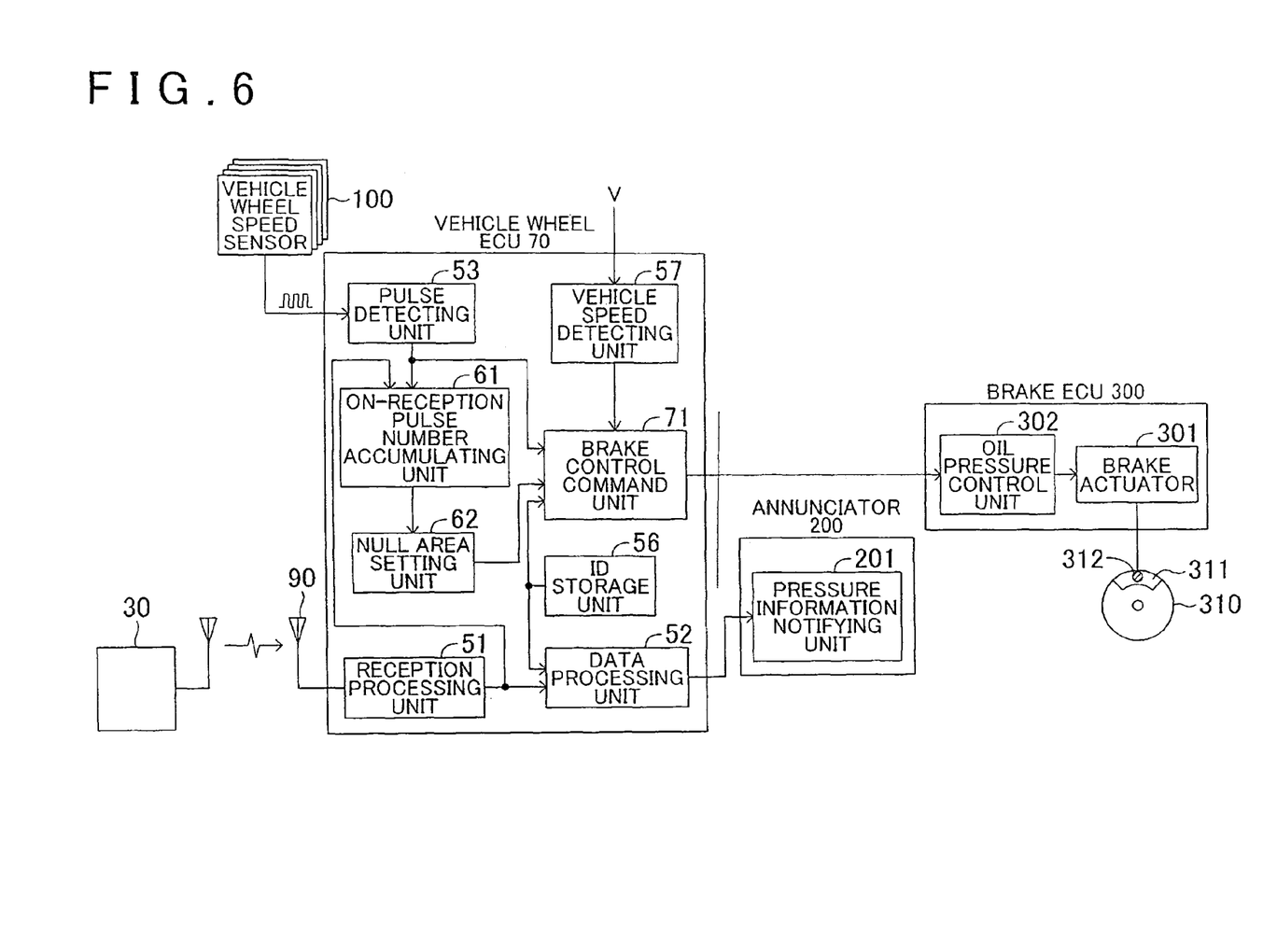
FIG. 6 is a functional block diagram illustrating a sensor unit and a vehicle wheel ECU according to a third embodiment of the present invention.

The vehicle wheel information acquiring device according to the third embodiment has a configuration in which a brake control command unit is provided instead of the sensor position determining unit 58 (63) in the configuration of the first embodiment or the second embodiment and the guidance information notifying unit 202 of the annunciator 200 is removed. FIG. 6 illustrates schematic configurations of a vehicle wheel ECU 70 and a brake ECU 300 connected to the vehicle wheel ECU 70 according to the third embodiment. The vehicle wheel ECU 70 is a modification of the vehicle wheel ECU 60 in the second embodiment.

The vehicle wheel ECU 70 includes a brake control command unit 71 instead of the sensor position determining unit 63. The brake control command unit 71 has a function of determining whether the revolution position of the sensor unit 30 at a predicted stopping position of the vehicle is included in the null area and a function of commanding the stopping position to the brake ECU 300 so that the revolution position of the sensor unit 30 is not included in the null area when it is determined that the revolution position of the sensor unit 30 is included in the null area.

The brake control command unit 71 is connected to the brake ECU 300 so as to enable bidirectional communication with each other. The brake ECU 300 includes a brake actuator 301 that adjusts the braking forces of four wheels and an oil pressure control unit 302 that controls the driving of the brake actuator 301 so as to control the braking forces. The brake actuator 301 is connected to wheel cylinders 312 of the four wheels and adjusts forces for pressing brake pads 311 against wheel discs 310 by controlling oil pressures supplied to the wheel cylinders 312.

Figure 7:
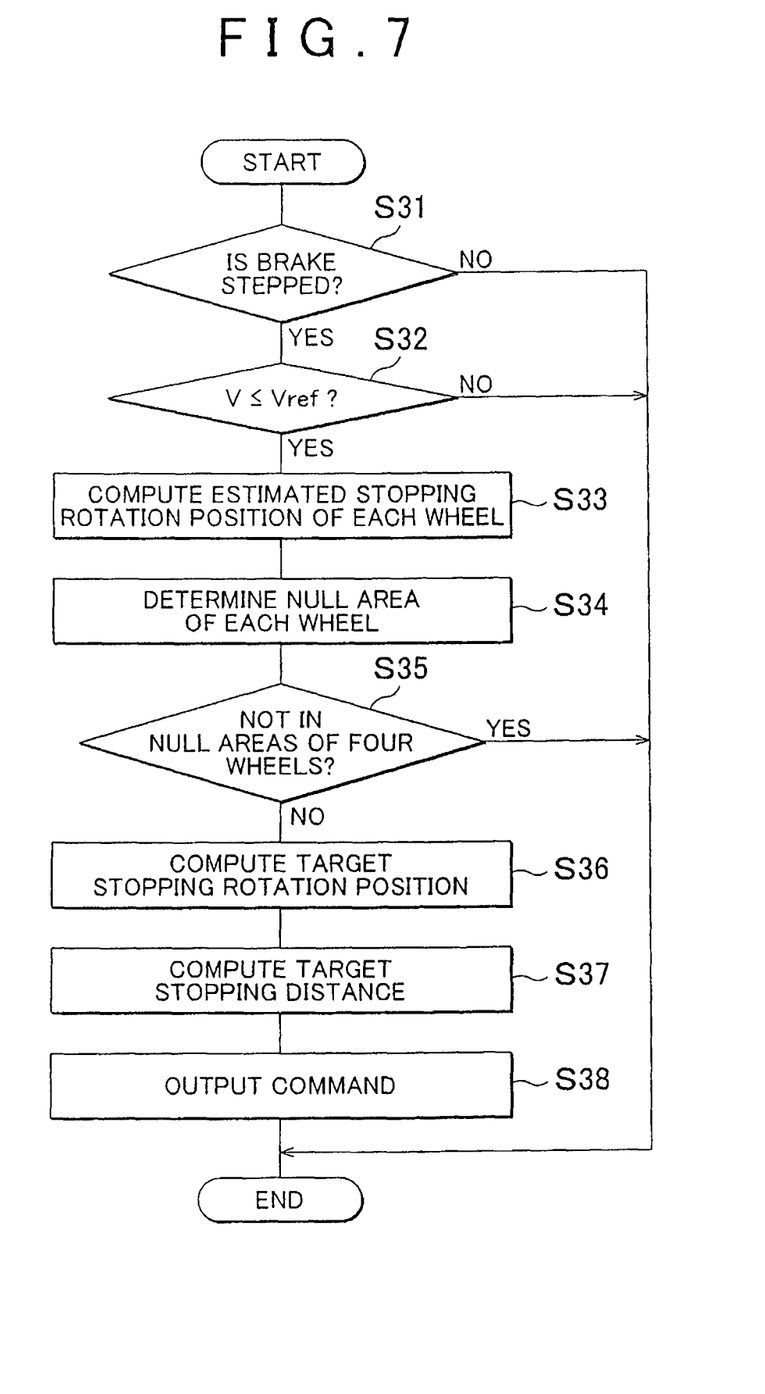
FIG. 7 is a flowchart illustrating a stop position command control routine according to the third embodiment.

The process performed by the brake control command unit 71 will be described below. FIG. 7 illustrates a stopping position command control routine that is performed by the brake control command unit 71. The stopping position command control routine is repeatedly performed for every predetermined short period. In step S31, the brake control command unit 71 reads a brake operating signal from the brake ECU 300 and determines whether the brake pedal is operated. The brake operation signal is a signal indicating whether the brake pedal is stepped and is output from the brake ECU 300. The brake control command unit 71 temporarily ends the routine when the brake operation signal is in the OFF state, that is, when the brake pedal is not operated. When the brake operation signal is in the ON state (YES in step S21), the brake control command unit 71 reads the vehicle speed V from the vehicle speed detecting unit 57 and determines whether the vehicle speed V is lower than or equal to a predetermined very-low speed Vref (for example, 5 km/h) in step S32. When it is determined that the vehicle speed V is higher than the very-low speed Vref (NO in step S22), the routine temporarily ends.

The brake control command unit 71 repeatedly performs this process, detects a vehicle speed acceleration a on the basis of the variation of the time interval of the pulse signal output from the vehicle wheel speed sensor 100 in step S33 when the brake operation signal is in the ON state and the vehicle speed V is lower than or equal to the very-low speed Vref, and estimates after how many pulses the vehicle stops on the basis of the vehicle speed V and the vehicle body acceleration a (here, acceleration in the negative direction, that is, deceleration). That is, the rotation angle of the vehicle wheel until the vehicle stops is estimated.

In general, the relationship between the vehicle speed V, the acceleration a, and the distance y can be expressed by Expression (1).

$$V^2 = 2 \times a \times y \tag{1}$$

The distance y corresponds to the rotation angle of the vehicle wheel W. Accordingly, the angle by which the vehicle wheel W rotates until the vehicle stops can be calculated from this relational expression. In step S33, the brake control command unit 71 calculates a estimated stopping rotation position of each vehicle wheel W out of four vehicle wheels W by adding the rotation angle (number of pulses), by which the vehicle wheel W is estimated to rotate until the vehicle stops, to the current rotation position (the current pulse number) of the vehicle wheel W.

Subsequently, in step S34, the brake control command unit 71 determines whether the revolution position of the sensor unit 30 is included in the null area on the basis of the estimated stopping rotation position of the vehicle wheel W for each vehicle wheel W. Then, in step S35, the brake control command unit 71 determines whether the revolution position of the sensor unit 30 is not included in the null area for all of the four vehicle wheels W. When the determination result is "YES", the brake control command unit 71 temporarily ends the routine. On the other hand, when the determination result is "NO", that is, when it is estimated for any wheel that the revolution position of the sensor unit 30 is included in the null area when the vehicle stops, the brake control command unit 71 calculates a target stopping rotation position of the vehicle wheel W at which the sensor unit 30 is not included in the null area for all the four wheels in step S36, and calculates a target stopping distance y* corresponding to the rotation angle from the current rotation position of the vehicle wheel to the target stopping rotation position in step S37.

Subsequently, in step S38, the brake control command unit 71 transmits the calculated target stopping distance y* to the brake ECU 300 (the oil pressure control unit 302) and then temporarily ends the routine. Here, since the brake ECU 300 is connected to the vehicle wheel speed sensors 100 and receives the pulse signals, the brake control command unit 71 may transmit a target number of pulses corresponding to the target stopping distance y* instead of the target stopping distance y*. Alternatively, a target acceleration a* (deceleration) for causing the vehicle to stop so that the revolution position of the sensor unit 30 is not included in the null area for all of the four wheels may be calculated and may be transmitted to the brake ECU 300. In this case, the target acceleration a* can be calculated using Relational Expression (1).

When the target stopping distance y* is input, the oil pressure control unit 302 of the brake ECU 300 calculates the target acceleration a* (deceleration) on the basis of the vehicle speed V and the target stopping distance y*, sets a target braking force with which the target acceleration a* is obtained, and controls the operation of the brake actuator 301 so as to control the hydraulic pressure of the wheel cylinder 312 to a target hydraulic pressure corresponding to the target braking force. Accordingly, the vehicle can be made to stop at a position at which the revolution position of the sensor unit 30 is not included in the null area for all the four wheels.

In the vehicle wheel information acquiring device according to the third embodiment, the vehicle wheel ECU 70 transmits a brake control command, which causes the stopping rotation position of the vehicle wheel W to reach a position at which the revolution position of the sensor unit 30 is not included the null area, to the brake ECU 300. Then, the brake ECU 300 controls the brake actuator 301 in accordance with the brake control command so as to adjust the braking force. Accordingly, the stopping rotation position of the vehicle wheel W can be automatically made to reach a position at which the revolution position of the sensor unit 30 is not included in the null area without causing the driver to adjust the degree of stepping on the brake pedal. Accordingly, it is possible to reduce the number of cases in which the tire pressure information cannot be acquired before start of the running. When the stopping rotation position of the vehicle wheel W is adjusted, the stopping rotation position is adjusted in a direction in which the braking force increases so that the vehicle wheel stops prior to the estimated rotation position and it is thus possible to safely stop the vehicle.

While the vehicle wheel information acquiring devices according to the embodiments have been described hitherto, the present invention is not limited to the above-mentioned embodiments but can be modified in various forms without departing from the object of the present invention.

For example, in the embodiments, the notification or the brake control is performed so as to reach a position at which the revolution position of the sensor unit 10 (30) is not included in the null area for all of the four wheels, but when it is known that the null area is not present in a specific vehicle wheel W out of the four wheels, such a vehicle wheel W may be excluded from a control target.

In the first embodiment and the second embodiment, the relationship between the current revolution position of the sensor unit 10 (30) and the null area is determined, but the revolution position of the sensor unit 10 (30) at an estimated stopping position of the vehicle (referred to as estimated stopping revolution position) may be calculated and the relationship between the estimated stopping revolution position and the null area may be determined.

In the third embodiment, when the revolution position of the sensor unit 10 (30) cannot be excluded from the null area, a notification command indicating the intent thereof may be output from the brake ECU 300 to the annunciator 200.

The third embodiment employs the configuration in which the brake control command unit 71 is provided instead of the sensor position determining unit 63 of the vehicle wheel ECU 60 in the second embodiment, but a configuration in which the brake control command unit 71 is provided instead of the sensor position determining unit 58 of the vehicle wheel ECU 50 in the first embodiment may be employed.

In the embodiments, each sensor unit 10 (30) includes the temperature sensor 12 in addition to the pressure sensor 11, but a configuration not provided with the temperature sensor 12 may be employed.

The invention claimed is:

1. A vehicle wheel information acquiring device comprising:
    a vehicle wheel sensor that includes a sensor unit and a transmission unit, the sensor unit being fixed to a vehicle wheel and being configured to detect a vehicle wheel state quantity indicating a state of the vehicle wheel, the transmission unit being configured to transmit the vehicle wheel state quantity detected by the sensor unit at a predetermined timing using a radio signal, and the vehicle wheel sensor being configured to revolve around an axle with a rotation of the vehicle wheel; and
    a vehicle-body-side device that includes a reception unit, a processing unit, a rotation position acquiring unit, an on-reception rotation position storage unit, and a determination unit, the reception unit being fixed to a vehicle body and being configured to receive the radio signal transmitted from the vehicle wheel sensor, the processing unit being configured to acquire the vehicle wheel state quantity from the radio signal received by the reception unit and to perform a process corresponding to the vehicle wheel state quantity, the rotation position acquiring unit being configured to acquire a rotation position of the vehicle wheel, the on-reception rotation position storage unit being configured to store the rotation position of the vehicle wheel when the radio signal is received, and the determination unit being configured to determine whether a revolution position of the vehicle wheel sensor is included in an insufficient received intensity area based on the rotation position of the vehicle wheel when the radio signal is received during a stopping operation of a vehicle and a current rotation position of the vehicle wheel,
    wherein the insufficient received intensity area is a revolution position range of the vehicle wheel sensor in which the received intensity of the radio signal in the reception unit is insufficient.

2. The vehicle wheel information acquiring device according to claim 1, wherein the transmission unit of the vehicle wheel sensor is configured to transmit the radio signal when the revolution position of the vehicle wheel sensor reaches a predetermined position,
    wherein the vehicle-body-side device further includes an insufficient received intensity area storage unit configured to store the insufficient received intensity area in advance,
    wherein the determination unit is a revolution position estimating unit configured to estimate the revolution position of the vehicle wheel sensor based on the rotation position of the vehicle wheel when the radio signal is received and the current rotation position of the vehicle wheel, and
    wherein the determination unit is configured to estimate the revolution position of the vehicle wheel sensor during the stopping operation of the vehicle and to determine whether the estimated revolution position of the vehicle wheel sensor is included in the insufficient received intensity area.

3. The vehicle wheel information acquiring device according to claim 1, wherein the transmission unit of the vehicle wheel sensor is configured to transmit the radio signal at predetermined time intervals, wherein the vehicle-body-side device further includes an insufficient received intensity area setting unit configured to accumulate data indicating the rotation position of the vehicle wheel when the radio signal is received and to set a rotation position area of the vehicle wheel in which the received intensity of the radio signal in the reception unit is insufficient as the insufficient received intensity area based on the accumulated data, and wherein the determination unit is configured to determine whether the rotation position of the vehicle wheel during the stopping operation of the vehicle is included in the set insufficient received intensity area.

4. The vehicle wheel information acquiring device according to claim 1, wherein the determination unit is configured to transmit a notification command to notify a driver of a determination result to an annunciator when it is determined that the revolution position of the vehicle wheel sensor is included in the insufficient received intensity area, and wherein the annunciator is configured to notify the driver of the determination result.

5. The vehicle wheel information acquiring device according to claim 1, wherein the determination unit is a brake control command unit configured to output, to a brake controller, a control command to control a braking force of the vehicle wheel so as to cause the revolution position of the vehicle wheel sensor at a time of stopping of the vehicle not to be included in the insufficient received intensity area.

6. The vehicle wheel information acquiring device according to claim 5, wherein the brake control command unit is configured to set a target stopping rotation position of the vehicle wheel which is a position at which the revolution position of the vehicle wheel sensor at the time of stopping of the vehicle is not included in the insufficient received intensity area and to output the control command to cause the rotation position of the vehicle wheel at the time of stopping of the vehicle to be the target stopping rotation position.

7. The vehicle wheel information acquiring device according to claim 1, wherein the vehicle wheel sensor further includes a tire pressure sensor configured to detect a tire pressure, and wherein the transmission unit is configured to transmit information indicating the detected tire pressure to the reception unit using the radio signal.

8. The vehicle wheel information acquiring device according to claim 1, wherein the rotation position acquiring unit is configured to acquire the rotation position of the vehicle wheel based on a pulse signal output from a vehicle wheel speed sensor when the vehicle wheel rotates by a predetermined angle.

* * * * *